J. W. COOPER.
APPARATUS FOR CUTTING TRENCHES FOR DRAINS AND THE LIKE.
APPLICATION FILED JULY 21, 1915.

1,234,449.

Patented July 24, 1917.

Inventor
James Wilson Cooper
by E. Brozdon Marks
Attorney.

UNITED STATES PATENT OFFICE.

JAMES WILSON COOPER, OF MERINO DOWNS, OTAGO, NEW ZEALAND.

APPARATUS FOR CUTTING TRENCHES FOR DRAINS AND THE LIKE.

1,234,449.

Specification of Letters Patent.

Patented July 24, 1917.

Application filed July 21, 1915. Serial No. 41,145.

*To all whom it may concern:*

Be it known that I, JAMES WILSON COOPER, a citizen of the Dominion of New Zealand, and residing at Merino Downs, Otago, in the Provincial District of Otago, in the Dominion of New Zealand, have invented certain new and useful Improvements in Apparatus for Cutting Trenches for Drains and the like, of which the following is a specification.

The object of the present invention is to provide an improved implement for cutting trenches for the reception of drain pipes and the like and for other purposes.

The invention consists in the novel features of construction and arrangements of parts hereinafter described and pointed out in the appended claims.

The drawing herewith illustrates the invention, which will now be described in detail.

Figure 1:
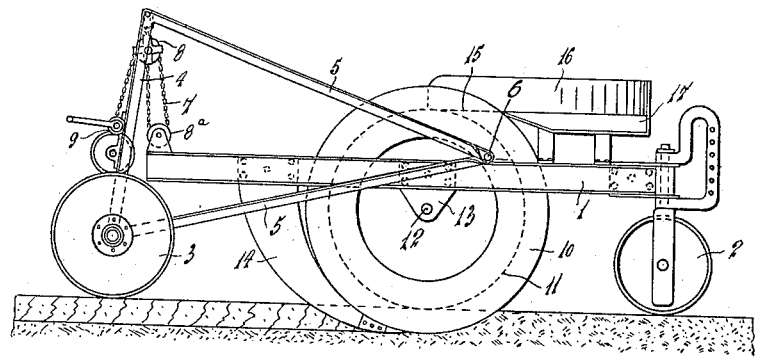
Figure 1, is a side elevation.
Figure 2:
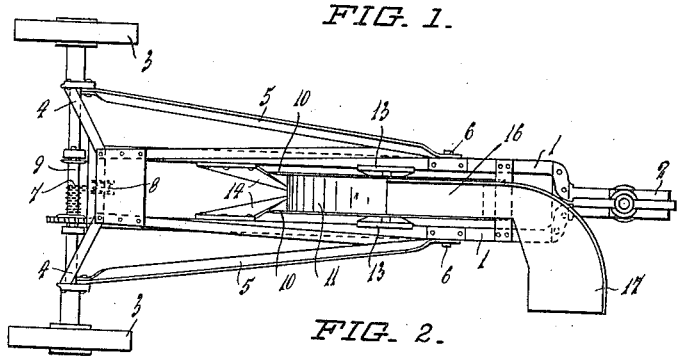
Fig. 2, is a plan of the implement.
Figure 3:
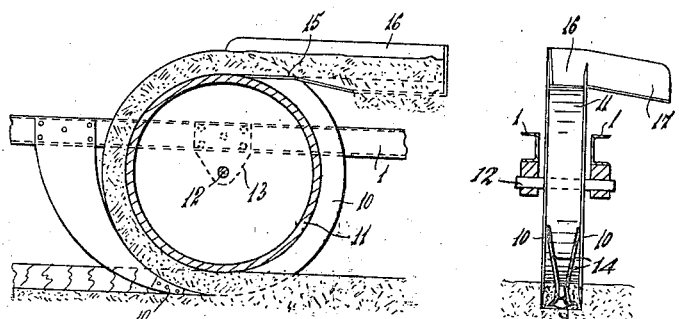
Fig. 3, is a longitudinal section.
Figure 4:
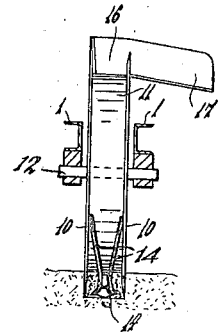
Fig. 4, is a rear view of a drum and colters.

The horizontal frame 1 is carried on a leading wheel 2 and at the rear end is supported by means of a chain 7, pulleys 8 and 8ª and a winch 9 mounted upon a vertical frame 4 comprising converging arms 5 whereby the said vertical frame is pivoted by a pin 6 to the horizontal frame 1. The rear end of the frame 4 is carried on traveling wheels 3.

A pair of cutting disk colters 10 are fixed to and spaced apart by a drum 11, which has a diameter smaller than the diameter of the colters. The colters with their drum are mounted upon an axle 12 journaled in brackets 13 fixed to the horizontal frame 1.

A share knife 14 for cutting the bottom of the trench is fixed behind the drum to the frame 1 and extends below the drum 11 to a depth corresponding to the depth of the colters.

A scraper knife 15 forms the mouth of a chute 16 at the top of the drum, and has a tail piece 17 for delivering material at the side of the implement.

The implement is drawn over the land in which a trench is to be cut, and at the start the rear end of the frame is lowered by means of the winch 9 until the colters have sunk into the ground and the drum 11 rides on the surface thereof. The colters cut sides of the trench and material cut by the colters is lifted by the share knife 14 and carried upward by the drum and colters. The scraper knife 15 removes the material from the colters and drum, and the material then passes along the chute 16 and is delivered through the tail piece 17.

If the depth of the trench is to be increased, a second cut is taken by lowering the frame 1 still farther and traveling the drum and colters along the bottom of the trench already cut.

The colters may be adjustable to enable the width of the trench to be varied, and the drum between them may be removed and replaced by another of larger or smaller diameter according to the depth desired to be cut at each operation.

What I do claim and desire to secure by Letters Patent of the United States is:—

1. A device of the character described, comprising in combination, a frame carrying wheels at its rear end, a second substantially horizontal frame carrying a wheel at its forward end, the second frame being pivotally connected intermediate its ends to the forward end of the first frame and having its rear end located adjacent the rear end of the first frame, a trench cutting device mounted on the second frame immediately in rear of the pivotal connection thereof with the first frame and means extending between the rear ends of said frames for determining the relative positions of said frames.

2. In a device of the character described, in combination, a frame carrying wheels at its rear end and comprising side portions each consisting of a rear vertical member and converging members connected to the vertical member and connected together at their front ends, a second frame substantially horizontal carrying a wheel at its forward end, the second frame being pivotally connected intermediate its ends to the forward end of the first frame and having its rear end located adjacent the rear end of the first frame, a trench cutting device mounted on the second frame immediately in rear of the pivotal connection thereof with the first frame, and a winch and chain connection between the rear end of the second frame and the vertical rear members of the first frame.

In testimony whereof I have signed my name to this specification in the presence of two witnesses.

JAMES WILSON COOPER.

Witnesses:
WILLIAM AGNEW,
JAMES JOHNSTON.

Copies of this patent may be obtained for five cents each, by addressing the "Commissioner of Patents, Washington, D. C."